United States Patent [19]

Brown

[11] Patent Number: 4,579,005

[45] Date of Patent: Apr. 1, 1986

[54] SINGLE CRYSTAL DOPPLER FLOWMETER

[75] Inventor: Alvin E. Brown, Santa Cruz, Calif.

[73] Assignee: Manning Technologies, Inc., Scotts Valley, Calif.

[21] Appl. No.: 672,313

[22] Filed: Nov. 15, 1984

[51] Int. Cl.$^4$ ................................................ G01F 1/66
[52] U.S. Cl. .................................................... 73/861.25
[58] Field of Search ......................... 73/861.25; 367/90

[56] References Cited

U.S. PATENT DOCUMENTS

| | | | |
|---|---|---|---|
| 3,443,433 | 5/1969 | Liston et al. ...................... | 73/861.25 |
| 3,575,050 | 4/1971 | Lynnworth ...................... | 73/861.27 |
| 3,675,192 | 7/1972 | Fahrbach ...................... | 73/861.25 X |
| 3,922,911 | 12/1975 | Groves et al. ................... | 73/861.25 |
| 4,255,977 | 3/1981 | Newhouse et al. ............... | 73/861.25 |
| 4,324,258 | 4/1982 | Huebscher et al. ................ | 128/663 |
| 4,372,167 | 2/1983 | Loveland ......................... | 73/861.28 |
| 4,372,168 | 2/1983 | Watson ............................ | 73/861.28 |
| 4,391,149 | 7/1983 | Herzl ............................. | 73/861.25 |
| 4,413,531 | 11/1983 | Karplus et al. ................... | 73/861.25 |
| 4,438,652 | 3/1984 | Saito ............................. | 73/861.25 |

OTHER PUBLICATIONS

Daugherty and Franzini, "Fluid Mechanics with Engineering Applications", 6th Ed., McGraw-Hill, p. 210.
National Semiconductor, "MF10 Universal Monolithic Dual Switched Capacity Filter", 1982.

*Primary Examiner*—Charles A. Ruehl

[57] ABSTRACT

A Doppler flowmeter which utilizes a single crystal immersed in the flow stream directing energy in a direction parallel with the flow direction. The crystal is fed by an oscillator at a single frequency corresponding to an ultrasonic vibrational mode for the crystal. The crystal also detects reflected acoustic wave energy with the input and output signals being electrically combined in the crystal. An electrical discriminator circuit is able to separate a multi-spectral Doppler signal from the crystal by phase cancellation of the transmitted signal. The recovered signal is fed to a tunable state variable filter which establishes a ninety degree phase shift with the incoming multi-spectral signal. This phase shifted signal is combined with the incoming multi-spectral signal in a phase lock loop with an output of the loop used to clock the state variable filter. Another output is a synthesized Doppler frequency representative of the mean Doppler frequency.

13 Claims, 6 Drawing Figures

SINGLE CRYSTAL DOPPLER FLOWMETER

DESCRIPTION

1. Technical Field

The invention relates to Doppler ultrasonic flowmeters.

2. Background Art

One of the problems encountered in Doppler flowmeters of the prior art relates to precise determination of the Doppler frequency. Flowmeters rely upon scattering of ultrasonic waves from particles in the flow stream. The particles are at different distances from the source and are at different radial distances in the flow stream. Also, different refractive properties can affect the scattered acoustic waves. In attempting to detect a Doppler return signal in an ultrasonic flowmeter, there is not a single Doppler frequency, but a spectrum of Doppler frequencies. This spectrum is not continuous, but a distribution of short duration discontinuous lines, with no phase continuity between lines. From this spectrum, a determination must be made.

Typically in the prior art, two sonic elements are used to minimize cross coupling, one acting as a transmitter and one as a receiver. The received Doppler signal is beat with the transmitted signal. The difference frequency is applied to a limiter, resulting in a rectangular wave, which is then counted in a frequency counter or applied to a frequency-to-voltage converter. The wide distribution of Doppler frequencies and the presence of unwanted unrelated signals makes this technique subject to considerable error.

In U.S. Pat. No. 4,413,531, Karplus et al. recognize the problem that the Doppler signal consists of a band of different frequencies. In that patent, the approach to Doppler signal detection involves generation of an error function signal based upon signal ratios and comparisons of the ratios. A feedback loop is used to stabilize the system.

A problem with prior art methods for establishing a Doppler frequency is that flowmeter accuracy is impaired by the nature of the Doppler spectral distribution, as well as by noise. An object of the present invention was to devise a more accurate Doppler flowmeter.

SUMMARY OF INVENTION

The above object has been achieved with a new Doppler flowmeter which features a single crystal as both the transmitter and receiver transducer and a tunable filter as a new signal processing component. The single crystal is a piezoelectric crystal excited at an ultrasonic frequency. The crystal is located in the flow stream, directing acoustic waves along flow lines. Such a crystal is exposed to reflected ultrasonic wave energy and, because of the piezoelectric effect, generates a Doppler signal therein.

A discriminator circuit, connected to the crystal, is able to separate a multi-spectral Doppler signal from the transmitted signal. This signal is then sent to a circuit which features a variable phase quadrature filter which produces a phase shift adjusted to be ninety degrees between the multi-spectral Doppler signal and a new phase-offset Doppler signal. This signal is transmitted to a phase lock loop which is able to lock onto a mean Doppler frequency signal which becomes a synthesized Doppler output frequency signal. A feedback loop uses this synthesized output to clock the phase quadrature circuit in a way such that phase quadrature is maintained. The synthesized Doppler output frequency signal is directly proportional to flow velocity.

Use of a single crystal in the flow stream has several beneficial effects. The quantity of electrical circuits for transmitters and receivers is drastically reduced and more sensitive performance is obtained. The synthesized output frequency is found to be more accurate and representative of flow velocity.

BEST MODE FOR CARRYING OUT THE INVENTION

Figure 1:
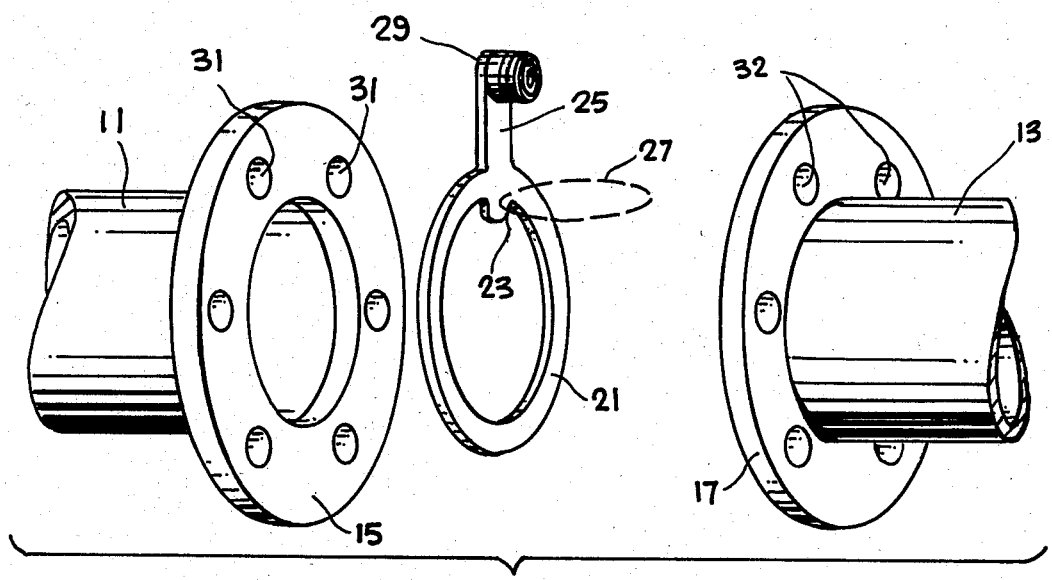
FIG. 1 is a perspective view of abutting pipe sections with a flowmeter transducer of the present invention mounted on an annular flange therebetween.

With reference to FIG. 1, a pair of pipe sections 11 and 13 is seen having respective flanges 15 and 17. Between these flanges, a third annular flange 21 is disposed having a radially inwardly extending tab section 23 and an outwardly extending tab section 25. The inwardly extending tab section has a transducer mounted thereon for generating ultrasonic acoustic waves. The transducer is mounted in a manner such that a wave pattern is projected generally parallel to the fluid flow as indicated by the dashed lines 27. The radial position of the transducer is such that the flow velocity in the vicinity of the transducer is equal to the average flow in the pipe. Signals to and from the transducer are carried by a wire which may be internal to the tabs, terminating in a cable connector 29 which is external to flanges 15 and 17. The annular flange 21 is sandwiched between flanges 15 and 17 so that the flange itself is not in the flow pattern. The flanges are connected together by means of flange bolts extending through respective holes 31 and 32.

Figure 2:
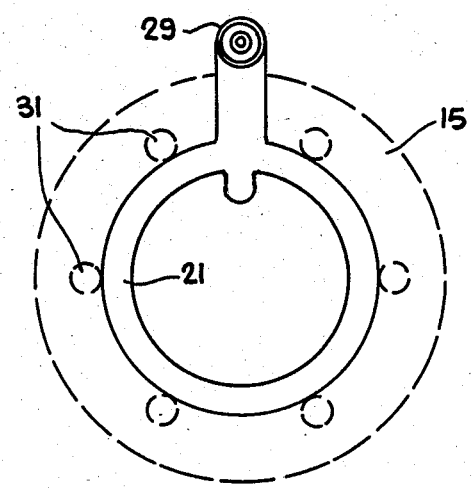
FIG. 2 is a top view of the annular flange of FIG. 1.

In FIG. 2 it can be seen that annular third flange 21 is radially inward of holes 31 so that the third flange does not interfere with these holes and cable connector 29 is radially outward of the outer circumference of pipe flange 15. Thus, the flowmeter of the present invention is almost totally concealed within a pipe system, obviating the need for transducer housings which protrude from external surfaces of pipes, found in the prior art. This leads to more compact pipe geometries.

Figure 3:
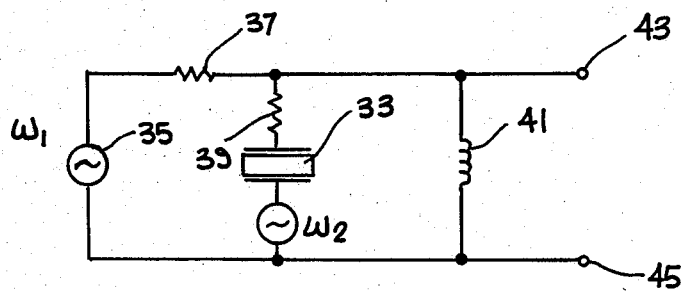
FIG. 3 is an electrical representation of a piezoelectric crystal and inductive load for use with the annular flange of FIG. 1.

The ability to use a single crystal is explained with reference to FIG. 3. FIG. 3 shows a piezoelectric ceramic crystal 33 which is driven by an electrical oscillator 35 having a frequency $\omega_1$. The oscillator has an internal resistance 37 while the internal resistance of the crystal is shown by resistor 39, termed $R_2$. An inductive load 41 is placed in parallel with the crystal across terminals 43 and 45. The crystal 33 receives all pressure waves hitting it. These waves include acoustic reflected waves from particles in the fluid medium. These waves carry the Doppler signal. Other waves include undesired mechanically induced noise at a much lower frequency than the transmitted frequency. Since the crystal is linear all these signals are mixed together. No non-linear modulation occurs. The total signal, $\omega_o$, is equal to the transmitted signal plus the received signal. The received signal is a linear combination of a noise signal plus a Doppler signal. The noise signal is filtered by the internal resistance of the crystal when the following condition applies:

$$X_{L\omega_N} << R_2 << X_{L\omega_2}$$

where $X_{L\omega_N}$=reactance of inductor 41 at noise frequency $X_{L\omega_2}$=reactance of inductor 41 at Doppler modulation frequency $R_2$=resistance of resistor 39

When the noise is filtered out, the remaining signal is a linear combination of the transmitted signal plus the received Doppler signal. Such a signal, while having the appearance of an amplitude modulated wave, is in fact the equivalent of a single side band with carrier signal. An analysis of the waveform has shown signal with one-half the amplitude swing of an equivalent double-side band amplitude modulated waveform and one-half the phase swing of an equivalent frequency modulated waveform. While the frequency modulated component was selected for processing, the amplitude modulated component could have been selected as well.

The frequency modulated component is processed in the circuit of FIG. 4 which is a digital discriminator connected in the following way. Terminal 45 in FIG. 3 may be grounded and terminal 43 is connected to input terminal 53 in FIG. 4 such that the composite waveform containing both the transmitted signal component and the Doppler component is applied to terminal 53. Terminal 55 is connected to a lead coming from oscillator 35 in FIG. 3 such that a signal representing the transmitted waveform is applied to terminal 55. The composite signal is phase shifted by ninety degrees in a phase shifting network 57 and then both the composite signal and the transmitted signal are fed to NOR-gate 59. Here the two signals are logically combined and then the output is taken through resistor 61 and capacitor 63 through an audio amplifier 65 and an output terminal 67.

Figure 5:
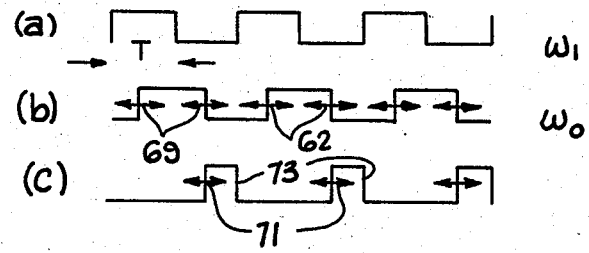
FIG. 5 shows three waveforms found in the circuit of FIG. 4.

Operation of this discriminator means may be understood with reference to the waveforms of FIG. 5. The waveform labeled (a) represents the signal applied to terminal 55, shown to be a square wave having a half-period T. The composite waveform, carrying the Doppler shift is indicated by the waveform shown in the plot (b). Here, the arrows 69 indicate shifting positive and negative waveform edges indicative of the Doppler modulation. From an overall standpoint, this received composite wave has generally the same half period as the waveform in (a), except that the edges are modulated. The combination of the two signals in the NOR-gate 59 yields the waveform shown in plot (c). Now, only one edge has arrows 71 indicating the modulated component, while an opposite edge 73 of the same half period wave has been stabilized, thereby simplifying the process of detecting the Doppler shifted component. By passing this signal through the R-C filter formed by resistor 61 and capacitor 63 the high frequency components in the resulting signal are rejected. All that remains is the modulation frequency and a d.c. offset.

Figure 4:
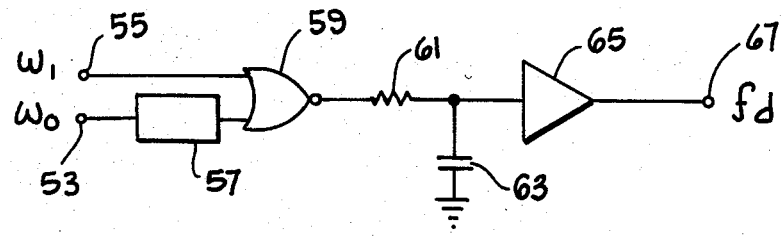
FIG. 4 is an electrical plan of a discriminator circuit for recovering a multi-spectral Doppler signal from a flow stream.

Audio amplifier 65, without a d.c. response, provides the recovered multi-spectral Doppler signal at terminal 67 in FIG. 4. To generate the desired waveform shown in plot (a) of FIG. 5, oscillator 35 in FIG. 3 is selected to be a multivibrator having a square wave output. In this situation, the phase shifting network 57 need not be an external component but is automatically provided as a result of the capacitance of the crystal. The digital discriminator shown in FIG. 4 may be used by any type of Doppler system and is not restricted to that disclosed in the present invention.

Figure 6:
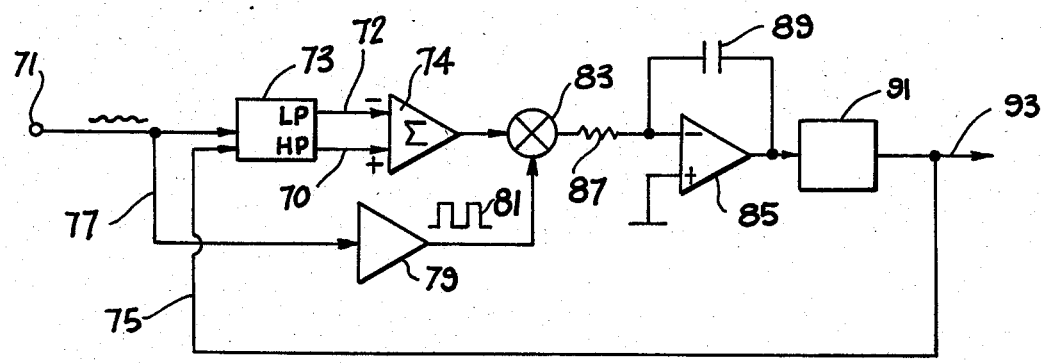
FIG. 6 is an electrical plan of a circuit connected to the output of the circuit shown in FIG. 4 and performs the function of synthesizing a Doppler output frequency signal from the multi-spectral Doppler signal of FIG. 4.

The Doppler signal from terminal 67 is applied to terminal 71 in FIG. 6. The circuit of FIG. 6 synthesizes a Doppler signal from the multi-spectral Doppler signal produced by the circuit of FIG. 4. It is known that, at the cutoff frequency, all second order lowpass filters have a phase shift of minus 90°. Similarly, second order highpass filters have a phase shift of plus 90° and bandpass filters have a zero degree phase shift. A state variable filter (SVF) is a convenient way of obtaining all three outputs at one time. SVFs using operational amplifiers may have phases inverted from that described above.

Switched capacitor SVFs are especially desirable because they may be precisely tuned. A filter sold by National Semiconductor Corporation as model MF10, a universal monolithic dual switched capacitor filter, is such a device. The clock rate of the capacitors is proportional to the cutoff frequency and so maintenance of the cutoff condition is facile, but any second order tunable filter could be used.

While the input line from terminal 71 carries the multi-spectral Doppler signal into the state variable filter 73, another input line 75 carries a clock signal. The input signal is also supplied along line 77 to limiter 79 which produces rectangular waves 81 which are applied to phase detector 83. The other input to the phase detector is the output from the SVF 73 which is selected to be in phase quadrature with the input. For example, the high pass output of the state variable filter is ninety degrees out-of-phase with the filter input at the cutoff frequency. However, the output of the SVF is not directly applied to the phase detector 83. If it were so connected, a problem may occur when the frequency of the voltage controlled oscillator 91 becomes so high that the cutoff frequency of the SVF 73 is much higher than the Doppler frequency. In this case there will be no output from the SVF and tracking of the Doppler frequency becomes discontinuous. To prevent this, highpass and lowpass outputs 70 and 72 are combined in summing amplifier 74. However, to have phase quadrature, the lowpass output is inverted, i.e. shifted by 180° before being combined with the highpass signal. By applying the highpass output 70 to the non-inverting input and the lowpass output 72 to the inverting input of a unity gain differential summing amplifier 74, the desired result is obtained.

The output of the phase detector 83 is transmitted to an electrical integrator 85 having input resistor 87 and a feedback capacitor 89. The electrically integrated signal is applied to a voltage controlled oscillator 91 which serves as a clock for the state variable filter 73 by means of feedback line 75. Output from the VCO is also taken along line 93 as the circuit output which is a synthesized frequency representing the mean Doppler frequency. Phase detector 83, integrator 85 and VCO 91 form a phase lock loop means which is connected to receive the multi-spectral Doppler input signal from terminal 71 through the state variable filter 73. The clock frequency which is transmitted along 75 is a signal which is N times the Doppler frequency where "N" is the switching ratio of the filter. While the state variable filter 73 is a second order filter, a fourth order filter would also work.

In review of operation, the present invention uses a single crystal, shown in FIGS. 1 and 3, inserted in the flow stream. The direction of ultrasonic radiation is parallel to the stream and at a location where the local velocity is equal to the average stream velocity. It is possible to use a single crystal because ceramic piezeoelectric devices are linear such that the ratio of applied voltage to physical deformation is constant for very wide ranges of applied voltage. Conversely, the ratio of generated voltage to physical excitation is constant. Accordingly, such a crystal can simultaneously act as both a receiver and a transmitter. Signals resulting from scatterers in the flowing medium are electrically mixed with the transmitted signal. The result is an equivalent of modulation of the transmitted signal where the modulation frequency is the difference between the transmitted and received signals. This signal represents Doppler frequency of the flow stream. No tuned circuits are needed. In fact, no electronics of any form, apart from the crystal and its excitation source, are required to produce the modulated waveform. The mixing of the two signals takes place across the internal resistance of the excitation source.

The Doppler signal has a frequency modulated component, as well as an amplitude modulated component. A digital discriminator circuit of the present invention, shown in FIG. 4, uses the frequency modulated component to derive a doppler frequency signal which is free of noise. This is accomplished by means of a ninety degree phase shift between the transmitted and received signals. This makes possible a combination of the transmitted and received signals whereby the output signal is simplified and stripped of noise.

The unprocessed Doppler signal is sent to a limiting amplifier 79 in FIG. 4 to produce rectangular waves and to a SVF 73 having a phase shift adjusted to ninety degrees relative to an output signal, termed a phase offset Doppler signal. This phase offset Doppler signal has a phase quadrature relation relative to the input signal, i.e. a ninety degree shift. The output of the phase quadrature device is part of a phase lock loop which is able to lock onto a signal, termed the synthesized Doppler frequency signal. The output of the phase lock loop is taken from voltage controlled oscillator 91 which not only provides the synthesized Doppler output signal, but also uses the same signal as a clock for the second order switched capacitor state variable filter. Phase quadrature is required in this filter to keep the loop stable. In a second order filter, quadrature only occurs when the filter is tuned to the cutoff frequency of the mean Doppler signal. Since the tuning of the filter is determined by the filter clock frequency, the clock frequency is a function of the mean Doppler frequency. Since the clock frequency is not subject to dropouts, it is a good representation of a multiple of the Doppler frequency. The particular multiple is the switching ratio of the filter.

One of the advantages of the present invention is that by using a single crystal in the flow stream, there is no need to align transmitter and receiver. Moreover, the external surfaces of pipes need not allow room for flowmeter protrusions, thereby allowing closer spacing of pipes. Yet another advantage is that electronic circuits are simplified since the ultrasonic signal is processed in a transceiver, rather than transmitter and receiver. The principal advantage of the present invention is flowmeter accuracy arising from having the crystal transducer observing one fixed flow point.

I claim:

1. An ultrasonic Doppler flowmeter comprising,
   a single piezoelectric crystal simultaneously transmitting and receiving ultrasonic waves in a flow stream,
   discriminator means connected to said crystal, said means having electrical signal inputs corresponding in frequency to said transmitted and received acoustic waves and having frequency comparison means for separating a multi-spectral Doppler signal therefrom,
   tunable phase quadrature means connected to receive said multi-spectral Doppler signal for establishing a phase shift of ninety degrees between said multi-spectral Doppler signal and a phase-offset Doppler signal, said phase-offset Doppler signal emerging as an output from said phase quadrature means,
   phase lock loop means connected to receive said multi-spectral Doppler signal and connected to said phase quadrature means for producing a synthesized Doppler output frequency signal from said phase-offset Doppler signal,
   an output terminal connected to said phase lock loop means for delivering said synthesized Doppler output frequency signal, and
   feedback means extending from said output terminal to said phase quadrature means for tuning said phase quadrature means for a phase shift of ninety degrees.

2. The flowmeter of claim 1 wherein said discriminator means comprises means for phase shifting the received signal ninety degrees relative to the transmitted signal and having means for logically combining the transmitted and received signals, thereby separating the multi-spectral Doppler signal therefrom.

3. The flowmeter of claim 1 wherein said phase lock loop means comprises,
   phase detector means connected to said discriminator means at a signal input terminal and to said phase quadrature means for phase comparing said multi-spectral Doppler signal and the phase-offset Doppler signal and generating a phase error signal in response thereto,
   integrator means connected to receive the phase error signal and produce an integrated error signal, and
   VCO means connected to receive said integrated error signal for producing said synthesized output frequency signal adjustable in response to said integrated error signal.

4. The flowmeter of claim 3 wherein a limiter is connected in a path between said phase detector means and said input terminal.

5. The flowmeter of claim 1 wherein said tunable phase quadrature means is a state variable filter.

6. The flowmeter of claim 1 wherein said single piezoelectric crystal is mounted on an annular flange between pipe sections.

7. The flowmeter of claim 6 wherein said crystal is mounted on a tab extending radially inwardly from the periphery of said flange.

8. The flowmeter of claim 1 wherein said crystal is disposed to transmit and receive ultrasonic waves parallel to the direction of flow in said flow stream.

9. A circuit for use in an ultrasonic Doppler flowmeter for synthesizing a Doppler signal from a composite multi-spectral Doppler signal comprising,
- a signal input terminal having a multi-spectral Doppler signal as an input,
- tunable phase quadrature means connected to the signal input terminal for establishing a phase shift of ninety degrees between said multi-spectral Doppler signal and a phase-offset Doppler signal, said phase-offset Doppler signal emerging as an output from said phase quadrature means,
- phase lock loop means connected to said signal input terminal and to said phase quadrature means for producing a synthesized Doppler output frequency signal from said phase-offset Doppler signal,
- an output terminal connected to said phase lock loop means for delivering said synthesized Doppler output frequency signal, and
- feedback means extending from said output terminal to said phase quadrature means for tuning said phase quadrature means for a phase shift of ninety degrees.

10. The circuit of claim 9 wherein said phase lock loop means comprises,
- phase detector means connected to said signal input terminal and to said phase quadrature means for phase comparing said multi-spectral Doppler signal and the phase-offset Doppler signal and generating a phase error signal in response thereto,
- integrator means connected to receive the phase error signal and produce an integrated error signal, and
- VCO means connected to receive said integrated error signal for producing said synthesized output frequency signal adjustable in response to said integrated error signal.

11. The circuit of claim 9 wherein said tunable phase quadrature means is a state variable filter.

12. The circuit of claim 9 wherein a limiter is connected in a path between said phase detector means and said input terminal.

13. A circuit for use in an ultrasonic Doppler flowmeter for recovering a multi-spectral Doppler signal comprising,
- a single piezoelectric crystal simultaneously transmitting and receiving ultrasonic waves in a flow stream, and
- discriminator means having electrical signal inputs corresponding in frequency to said transmitted and received acoustic waves and having means for phase shifting the received signal ninety degrees relative to the transmitted signal and means for logically combining the transmitted and received signals, thereby separating the multi-spectral Doppler signal therefrom.

* * * * *